United States Patent
Waragaya et al.

(10) Patent No.: US 10,391,928 B2
(45) Date of Patent: Aug. 27, 2019

(54) LIGHTING TOOL FOR VEHICLE

(71) Applicant: STANLEY ELECTRIC CO., LTD., Tokyo (JP)

(72) Inventors: Takeshi Waragaya, Tokyo (JP); Takashi Sugiyama, Tokyo (JP)

(73) Assignee: STANLEY ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 16/030,385

(22) Filed: Jul. 9, 2018

(65) Prior Publication Data

US 2019/0016252 A1 Jan. 17, 2019

(30) Foreign Application Priority Data

Jul. 14, 2017 (JP) .................... 2017-138346

(51) Int. Cl.
*F21S 41/675* (2018.01)
*G02B 26/02* (2006.01)
(Continued)

(52) U.S. Cl.
CPC ............. *B60Q 1/16* (2013.01); *F21S 41/147* (2018.01); *F21S 41/153* (2018.01); *F21S 41/16* (2018.01);
(Continued)

(58) Field of Classification Search
CPC ... B60Q 1/16; B60Q 1/24; B60Q 1/26; B60Q 1/08; B60Q 1/14; B60Q 1/50; B60Q 1/2607; B60Q 1/34; B60Q 1/0076; B60Q 2300/45; B60Q 2300/42; B60Q 2300/41; B60Q 2300/312; B60Q 2300/114; B60Q 2300/314; B60Q 2300/054; B60Q 2300/32; B60Q 2300/112; B60Q 2400/50;
(Continued)

(56) References Cited

U.S. PATENT DOCUMENTS

2004/0189447 A1* 9/2004 Okubo .................. B60Q 1/085
340/425.5
2017/0158112 A1* 6/2017 Mouri ...................... B60Q 1/04

FOREIGN PATENT DOCUMENTS

CN 204740418 U 11/2015
DE 102008061747 A1 6/2009
(Continued)

OTHER PUBLICATIONS

Extended European Search Report for the related European Patent Application No. 18182123.2 dated Nov. 21, 2018.

*Primary Examiner* — Tung X Le
*Assistant Examiner* — Henry Luong
(74) *Attorney, Agent, or Firm* — Kenealy Vaidya LLP

(57) ABSTRACT

A lighting tool for a vehicle that radiates light from a vehicle toward a road surface, the lighting tool for a vehicle including a light source device, a light modulation device that modulates light emitted from the light source device to form multi-gradation light including a high gradation part, a low gradation part and a zero gradation part, a projection unit that projects the multi-gradation light emitted from the light modulation device to the road surface as a light distribution pattern, and a control unit that controls the light source device and the light modulation device, wherein the light modulation device forms a drawing pattern as the high gradation part which is surrounded by the low gradation part in the light distribution pattern.

10 Claims, 10 Drawing Sheets

(51) Int. Cl.
*B60Q 1/16* (2006.01)
*F21S 41/147* (2018.01)
*F21S 41/663* (2018.01)
*F21S 41/16* (2018.01)
*F21S 41/153* (2018.01)
*G02B 26/08* (2006.01)

(52) U.S. Cl.
CPC ........... *F21S 41/663* (2018.01); *F21S 41/675* (2018.01); *B60Q 2300/054* (2013.01); *B60Q 2300/112* (2013.01); *B60Q 2300/32* (2013.01); *B60Q 2400/50* (2013.01); *G02B 26/0833* (2013.01)

(58) Field of Classification Search
CPC .. B60Q 1/085; G03B 21/008; G03B 21/2033; F21S 41/66; F21S 41/3675; F21S 10/00; F21S 41/14; F21S 41/153; F21S 41/663; F21S 41/675; F21V 14/00; G08G 1/16; B60W 40/04; B60W 50/14
USPC .......................................................... 315/79
See application file for complete search history.

(56) References Cited

FOREIGN PATENT DOCUMENTS

| | | | | |
|---|---|---|---|---|
| DE | 102014213179 A1 | | 1/2015 | |
| DE | 102015201764 A1 | | 8/2016 | |
| DE | 102015201766 A1 | * | 8/2016 | ............. B60Q 1/085 |
| EP | 2708801 A2 | | 3/2014 | |
| FR | 3041066 A1 | | 3/2017 | |
| FR | 3056680 A1 | * | 3/2018 | ........... B60Q 1/0076 |
| JP | 2004-210130 A | | 7/2004 | |

* cited by examiner

LIGHTING TOOL FOR VEHICLE

CROSS-REFERENCE TO RELATED APPLICATION

Priority is claimed on Japanese Patent Application No. 2017-138346, filed Jul. 14, 2017, the content of which is incorporated herein by reference.

BACKGROUND

Field of the Invention

The present invention relates to a lighting tool for a vehicle.

Description of Related Art

As a lighting tool for a vehicle in the related art, a lighting tool for a vehicle configured to display an image showing information on a road surface using contrasts in light has been proposed. Japanese Unexamined Patent Application, First Publication No. 2004-210130 discloses a lighting apparatus for a vehicle configured to form a dark section on a light distribution pattern using a reflective type digital light deflection apparatus and to draw information on a road surface using a shape of the dark section.

SUMMARY OF THE INVENTION

In Japanese Unexamined Patent Application, First Publication No. 2004-210130, information is drawn as a dark section in a light distribution pattern. For this reason, the dark section in the light distribution pattern may exert an influence on safe performance during driving.

An aspect of the present invention is directed to providing a lighting tool for a vehicle capable of enhancing safe performance while drawing information on a road surface.

A lighting tool for a vehicle of an aspect of the present invention is a lighting tool for a vehicle that radiates light from a vehicle toward a road surface, the lighting tool for a vehicle including: a light source device; a light modulation device that modulates light emitted from the light source device to form multi-gradation light including a high gradation part, a low gradation part and a zero gradation part; a projection unit that projects the multi-gradation light emitted from the light modulation device to the road surface as a light distribution pattern; and a control unit that controls the light source device and the light modulation device, wherein the light modulation device forms a drawing pattern as the high gradation part which is surrounded by the low gradation part in the light distribution pattern.

According to this configuration, the drawing pattern having a high illuminance is formed in the light distribution pattern. That is, it is possible to provide a lighting tool for a vehicle in which safe performance is enhanced while drawing information on a road surface without darkening the drawing pattern with respect to other portions in the light distribution pattern.

In the above-mentioned lighting tool for a vehicle, the lighting tool for a vehicle of an aspect may have a configuration in which the light modulation device forms an outline of the light distribution pattern using the zero gradation part.

According to this configuration, it is possible to change an outline of the light distribution pattern using the light modulation device and to provide a function of an adaptive front-lighting system (AFS) to the lighting tool for a vehicle.

In the above-mentioned lighting tool for a vehicle, the light source device may radiate light that includes a high illuminance region and a low illuminance region, the light modulation device may form the drawing pattern with the high gradation part surrounded by the low gradation part in the high illuminance region and sets the low illuminance region as a high gradation part of the low illuminance region, and the low gradation part of the high illuminance region and the high gradation part of the low illuminance region in the light distribution pattern may have substantially the same illuminance on the road surface.

According to this configuration, the light modulation device forms the drawing pattern having a high gradation in the high illuminance region, and sets a low gradation level such that a portion other than the drawing pattern in the high illuminance region has substantially the same illuminance as the low illuminance region. For this reason, a portion in which light is partially shielded by the light modulation device is only a portion other than the drawing pattern in the high illuminance region, and as a result, efficiency of utilization of light can be increased.

In the above-mentioned lighting tool for a vehicle, the light source device may have a light source unit in which a plurality of light emitting elements are arranged in a matrix, the control unit may have a luminescence amount controller that individually varies luminescence amounts of the plurality of light emitting elements, the light modulation device may move the drawing pattern, and the luminescence amount controller may control the luminescence amounts of the plurality of light emitting elements to move and enlarge the high illuminance region and to include the drawing pattern within the high illuminance region.

According to this configuration, also when the drawing pattern is moved, it is possible to realize a light distribution pattern that brightens the drawing pattern in comparison with portions other than the drawing pattern while increasing efficiency of utilization of light.

In the above-mentioned lighting tool for a vehicle, a vehicle speed detector that detects a speed of the vehicle may be provided, and the control unit may control a shape of the drawing pattern by instructing the light modulation device on the basis of a detection result of the vehicle speed detector.

According to this configuration, the drawing pattern can be changed according to the speed of the vehicle. As an example, the speed of the vehicle can be displayed on the road surface as an image, and thus, the driver can drive the vehicle while being conscious of the speed of his/her own vehicle.

In the above-mentioned lighting tool for a vehicle, the control unit may move a position of the drawing pattern in the light distribution pattern along a traveling direction of the vehicle, and may vary a moving speed of the drawing pattern according to the speed of the vehicle.

According to this configuration, the moving speed of the drawing pattern is varied according to the speed of the vehicle, and the drawing pattern is moved along the traveling direction of the vehicle. Accordingly, the driver can be made conscious of the speed of his/her own vehicle. Further, the driver can feel an exhilarating feeling of driving or can also be prompted to perform braking since the driver may feel the speed to be faster than the actual vehicle speed.

In the above-mentioned lighting tool for a vehicle, an expected traveling road information acquisition part that acquires information of an expected traveling road of the vehicle from the outside may be provided, and the control unit may display the drawing pattern that prompts change of the speed of the vehicle by instructing the light modulation device on the basis of the detection results of the vehicle speed detector and the information acquired by the expected traveling road information acquisition part.

According to this configuration, since the driver is prompted to change speed by the information of the expected traveling road, the driver can perform safer driving. Further, the expected traveling road information acquisition part acquires the information of the expected traveling road from, for example, a navigation system.

In the above-mentioned lighting tool for a vehicle, the light modulation device may generate a plurality of gradations in the high gradation part, and may form a distribution in an illuminance of the drawing pattern in the light distribution pattern.

According to this configuration, more varied expressions become possible for the drawing pattern.

In the above-mentioned lighting tool for a vehicle, the light modulation device may trim a periphery of the drawing pattern formed with the high gradation part by using the zero gradation part.

According to this configuration, since the periphery of the drawing pattern is trimmed by the zero gradation part to form a dark section, the driver can clearly recognize the drawing pattern.

According to the aspect, it is possible to provide a lighting tool for a vehicle in which safe performance is enhanced while drawing information on a road surface.

DETAILED DESCRIPTION OF THE INVENTION

Hereinafter, a lighting tool for a vehicle according to an embodiment will be described with reference to the accompanying drawings.

In order to make the features easier to understand, the drawings used in the following description may be shown by enlarging characteristic portions for the sake of convenience, and dimensional proportions or the like of components may not necessarily be the same as the actual ones.

Figure 1:
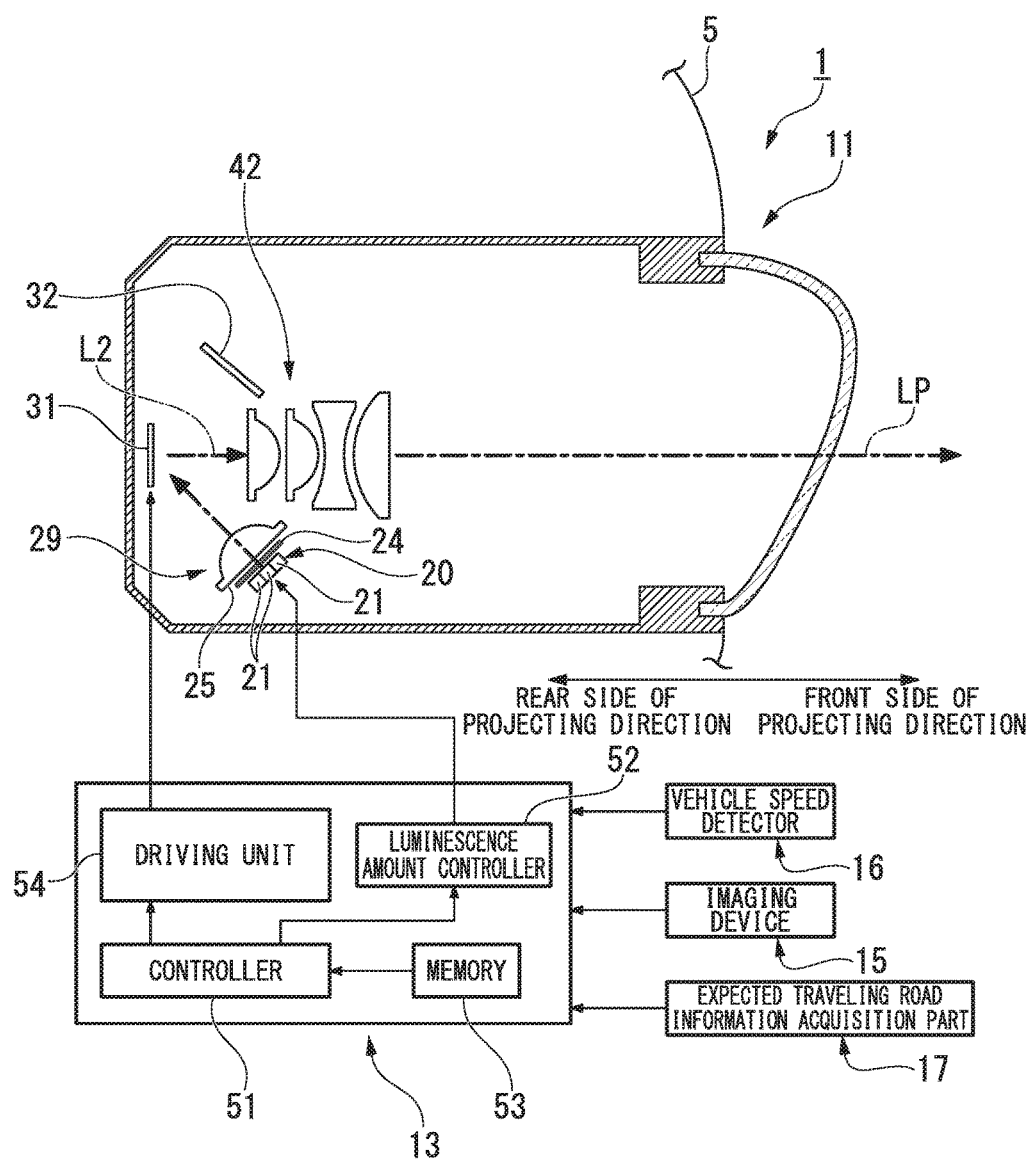
FIG. 1 is a schematic view of a lighting tool for a vehicle according to an embodiment.

FIG. 1 is a schematic view of a lighting tool 1 for a vehicle according to an embodiment. The lighting tool 1 for a vehicle of the embodiment is an apparatus for radiating light from a vehicle 5 toward a road surface. As shown in FIG. 1, the lighting tool 1 for a vehicle includes a projection module 11 configured to radiate light to the side in front of the vehicle 5, a control unit 13 configured to control the radiation, a vehicle speed detector 16 configured to detect a speed of the vehicle, an imaging device 15 configured to detect circumstances in the side in front and to transmit the detected circumstances to the control unit 13, and an expected traveling road information acquisition part 17 configured to acquire information of an expected traveling road of the vehicle 5 from the outside. The vehicle speed detector 16 is connected to the control unit 13. The projection module 11 of the embodiment includes a light source device 29, a light modulation device 31 and a projection optical system (a projection unit) 42.

First, the lighting tool 1 for a vehicle detects a speed of the vehicle 5 using the vehicle speed detector 16. In addition, the lighting tool 1 for a vehicle captures an image of in front of the vehicle using the imaging device 15 installed in the front section of the vehicle 5 (for example, on the front windshield side of a rearview mirror). Further, the lighting tool 1 for a vehicle acquires information of an expected traveling road of the vehicle 5 using the expected traveling road information acquisition part 17. Next, the control unit 13 controls the projection module 11 on the basis of detection results of the vehicle speed detector 16 (i.e., information of a speed of the vehicle 5) and information of an expected traveling road acquired by the expected traveling road information acquisition part 17 while analyzing image information acquired by the imaging device 15. Accordingly, the lighting tool 1 for a vehicle displays a light distribution pattern LP including a drawing pattern on a road surface 57 in front of the vehicle 5 on the basis of a speed of the vehicle 5.

The light source device 29 has a light source unit 20, a diffusion plate 24 and an incident optical system 25.

Figure 2:
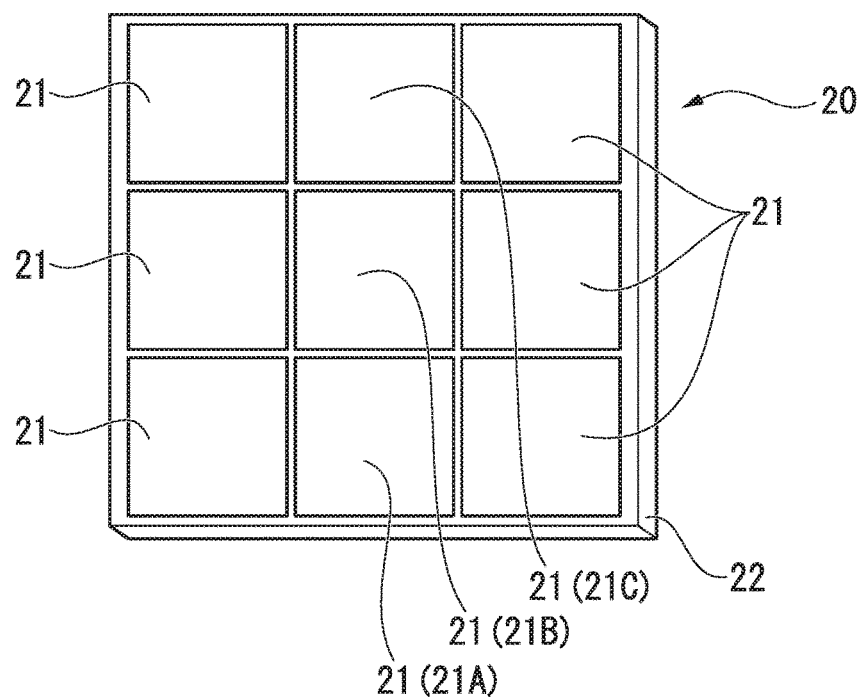
FIG. 2 is a schematic view of a light emitting unit of the lighting tool for a vehicle according to the embodiment.

FIG. 2 is a schematic view of the light source unit 20. The light source unit 20 is constituted by a plurality of light emitting elements 21 that are arranged in a matrix. That is, the light source unit 20 is an array light source having a plurality of light emitting elements 21. The light emitting elements 21 emit visible light. A light emitting diode (LED) light source or a laser light source may be employed for the light emitting elements 21.

The plurality of light emitting elements 21 are connected to luminescence amount controllers 52, respectively. Turning ON, OFF and luminescence amounts of the plurality of light emitting elements 21 are individually controlled by the luminescence amount controllers 52, respectively. That is, the luminescence amounts of the light emitting elements 21 can be adjusted between 100% at which the luminescence amount is a maximum and 0% at which the light emitting element 21 is completely turned off. The light emitting elements 21 are in an OFF state when the luminescence amount is in a state of 0%.

The light source unit 20 of the embodiment has nine light emitting elements 21 arranged in a matrix, and a light source package section 22. In the embodiment, the light emitting elements 21 are arranged in three rows in an upward and downward direction (a vertical direction) of the vehicle and three columns in a leftward and rightward direction (a horizontal direction) of the vehicle. In addition, the nine light emitting elements 21 are accommodated in the light source package section 22. A slight gap is formed between neighboring light emitting elements 21.

The number and arrangement configuration of the light emitting elements 21 of the light source unit 20 of the embodiment are an example and may be appropriately varied. That is, the number is not limited as long as the light source unit 20 has a plurality of light emitting elements 21. In addition, while the plurality of light emitting elements 21 of the light source unit 20 are arranged in a linear form in the upward and downward direction and the leftward and rightward direction in the embodiment, they may be arranged in any direction. However, some light emitting elements 21 among the plurality of light emitting elements 21 is preferably arranged in a direction perpendicular to a widthwise direction of the vehicle (for example, the upward and downward direction). When the light emitting elements 21 are arranged in this way, the light distribution regions 50 formed on the road surface by the light emitted from the light emitting elements 21 can be formed and arranged in a traveling direction of the vehicle 5. Accordingly, a configuration of moving a high illuminance region HA in the traveling direction of the vehicle 5 as described below can be realized.

Further, in the specification, the three light emitting elements 21 disposed at a center in the leftward and rightward direction and arranged in the upward and downward direction may be referred to as a first light emitting element 21A, a second light emitting element 21B and a third light emitting element 21C in sequence from a lower side toward an upper side in the vertical direction.

As described below on the basis of FIG. 3A to FIG. 3D, the nine light emitting elements 21 form light distribution regions 50, which are independent from each other, on the road surface 57 in front of the vehicle 5. That is, the lighting tool 1 for a vehicle forms the light distribution pattern LP constituted by nine light distribution regions 50 in front of the vehicle 5.

As shown in FIG. 1, the diffusion plate 24 is disposed between the light source unit 20 and the incident optical system 25. The diffusion plate 24 allows the incident light to diffuse and be transmitted therethrough. A light diameter of the light emitted from the light source unit 20 increases as the light passes through the diffusion plate 24.

As described above, a slight gap is formed between neighboring light emitting elements 21 in the light source unit 20 (see FIG. 2). When the light radiated from the light emitting elements 21 is projected to the road surface, the gap between the light emitting elements 21 may cause formation of a dark section on the light distribution pattern LP on the road surface 57. According to the embodiment, since the diffusion plate 24 is disposed between the light source unit 20 and the incident optical system 25, the light radiated from the light source unit 20 can blur and enter the incident optical system 25, and formation of the dark sections in the light distribution pattern LP on the road surface 57 can be prevented.

Further, when an element configured to radiate light other than white light is used as the light emitting element 21, a fluorescent material plate configured to receive the light radiated from the light emitting elements 21 and radiate diffusible white light may be used as the diffusion plate 24. A case in which the light emitting elements 21 radiate blue light (which may be ultraviolet light) may be exemplified. In the blue light entering the fluorescent material plate (the diffusion plate 24) containing fluorescent material particles, a wavelength of some of the light is changed by the fluorescent material particles while the blue light diffuses and is transmitted through the fluorescent body plate. The blue light caused by the light emitting elements 21 and yellow light discharged by excitation of the fluorescent material particles are mixed with each other, and as a result, diffusible white light is radiated from the fluorescent body plate. Further, a dispersing agent for diffusing blue light may be added to the inside of the fluorescent body plate.

The incident optical system 25 condenses the light radiated from the light source device 29 and entering thereinto via the diffusion plate 24 and radiates a reflection control surface of the light modulation device 31 with the light. The incident optical system 25 is constituted by one or a plurality of lens, or the like.

The light modulation device 31 is a device configured to modulate the light emitted from the light source device 29 to form multi-gradation light including a high gradation part, a low gradation part and a zero gradation part. In the embodiment, the light modulation device 31 is constituted by a reflective type digital light deflection apparatus (a digital mirror device (DMD)). The light modulation device 31 constituted by a reflective type digital light deflection apparatus has a reflection control surface configured by arranging a plurality of mirror elements that are tiltable.

The plurality of mirror elements of the light modulation device 31 drive tilting angles to a reflecting side (an ON state) or a shielding side (an OFF state) according to a signal from the control unit 13. The light modulation device 31 generates a reflection pattern L2 having an arbitrary shape using the reflected light of the plurality of mirror elements that are tilted to the reflecting side to be in the ON state. The reflection pattern L2 is radiated in front of the vehicle 5 as the light distribution pattern LP via the projection optical system 42.

In addition, a light receiving member 32 configured to shield the light from the mirror elements tilted toward the shielding side (the OFF state) is installed in the lighting tool 1 for a vehicle. The light reflected by the mirror elements tilted toward the shielding side to be in the OFF state is absorbed by the light receiving member 32 and does not enter the projection optical system 42.

The light modulation device 31 forms a multi-gradation reflection pattern L2 by rapidly driving between the ON states and the OFF states according to inclinations of the mirror elements and by adjusting a duty ratio in the ON states and the OFF states. The high gradation part, the low gradation part and the zero gradation part are included in the reflection pattern L2. The high gradation part is a portion in which all of the light entering the mirror elements enters the projection optical system 42. The low gradation part is a portion in which some of the light entering the mirror elements enters the projection optical system 42 due to high speed driving in the ON states and the OFF states. The zero gradation part is a portion in which all of the light entering the mirror element is shielded.

Further, while the case in which a reflective type digital light deflection apparatus is used as the light modulation device 31 has been described in the embodiment, another configuration may be provided as long as the light modulation device 31 is a device for modulating the incident light to form multi-gradation light including a high gradation part, a low gradation part and a zero gradation part. As an example, a transmission type or a reflection type liquid crystal element may be used as the light modulation device.

The projection optical system 42 radiates the reflection pattern L2 generated in the light modulation device 31 to a front side of the vehicle as the light distribution pattern LP and projects the reflection pattern L2 to the road surface. The projection optical system 42 according to the embodiment is constituted by a plurality of lenses arranged in an optical axis direction. However, the projection optical system 42 may be formed of a single lens, or may include a reflective mirror or the like.

The vehicle speed detector 16 detects a speed of the vehicle. The vehicle speed detector 16 may be configured to directly acquire the vehicle speed information from the vehicle. The vehicle speed information acquired by the vehicle speed detector 16 is transmitted to a controller 51 of the control unit 13 as an electrical signal.

The expected traveling road information acquisition part 17 acquires, for example, information of a road, on which the vehicle 5 is expected to travel, from a navigation system. The expected traveling road information acquisition part 17 may be the navigation system itself. The information of the expected traveling road acquired by the expected traveling road information acquisition part 17 is transmitted to the controller 51 of the control unit 13 as an electrical signal.

The control unit 13 has a memory 53, the controller 51, a driving unit 54 and the luminescence amount controllers 52. Control information or the like of various images has previously been set in the memory 53. The controller 51 generates a control signal on the basis of the electrical signal from the memory 53 and the vehicle speed detector 16.

The driving unit 54 drives the light modulation device 31 on the basis of the control signal transmitted from the controller 51. The luminescence amount controllers 52 individually change luminescence amounts of the plurality of light emitting elements 21.

The control unit 13 controls the light source device 29 and the light modulation device 31. More specifically, first, the control unit 13 determines a shape, a moving speed, and so on, of a drawing pattern D on the basis of the information of the speed of the vehicle 5 acquired by the vehicle speed detector 16. Further, the control unit 13 generates the light distribution pattern LP and the drawing pattern D by performing processing of controlling a tilting aspect of the mirror elements of the light modulation device 31 via the driving unit 54. Further, the control unit 13 adjusts the luminescence amounts of the plurality of light emitting elements 21 using the luminescence amount controllers 52 on the basis of the shape, the moving speed, and so on, of the determined drawing pattern D.

Next, the light distribution pattern LP formed by the lighting tool 1 for a vehicle will be described with reference to FIG. 3A to FIG. 3D. In FIG. 3A to FIG. 3D, a case is explained in which the drawing pattern D moves within the light distribution pattern LP from the vicinity of the vehicle 5 toward the side away from the vehicle 5.

As shown in FIG. 3A to FIG. 3D, the lighting tool 1 for a vehicle is mounted on the vehicle 5 and radiates the light distribution pattern LP to the road surface 57 in front of the vehicle 5. In addition, the lighting tool 1 for a vehicle displays the drawing pattern D on the light distribution pattern LP. The drawing pattern D of the embodiment is drawn as a pair of isosceles triangles having an apex thereof at a center of a traveling lane on which the vehicle 5 travels and which extends in a forward and rearward direction of the vehicle 5. Further, in the following drawings including FIG. 3A to FIG. 3D, solid lines are drawn clearly showing the traveling lane of the vehicle 5. The solid lines are drawn for clarity and does not indicate the light distribution pattern LP itself from the lighting tool 1 for a vehicle.

The light modulation device 31 forms an outline of the light distribution pattern LP using the zero gradation part. The light distribution pattern LP has a laterally asymmetric shape so as not to cause a driver in an oncoming car to experience glare.

The light modulation device 31 may have the light distribution pattern LP, which is laterally asymmetric, using the zero gradation part. The above-mentioned light distribution pattern LP can be realized by setting a portion which is desired to become a dark section in the light distribution pattern LP (a portion to be laterally asymmetric) as the zero gradation part by the light modulation device 31.

In addition, the light modulation device 31 may execute an adaptive front-lighting system configured to control the light distribution pattern LP on the basis of forward information acquired by the imaging device 15 connected to the control unit 13.

The light distribution pattern LP can be partitioned into nine light distribution regions 50 corresponding to the nine light emitting elements 21 of the light source device 29. The nine light distribution regions 50 are arranged in three rows and three columns in the leftward and rightward direction and the forward and rearward direction with respect to the vehicle 5. Among the nine light distribution regions 50, the three light distribution regions 50 disposed at a center in the leftward and rightward direction and aligned in the forward and rearward direction cover the traveling lane of the vehicle 5.

Figure 3A:
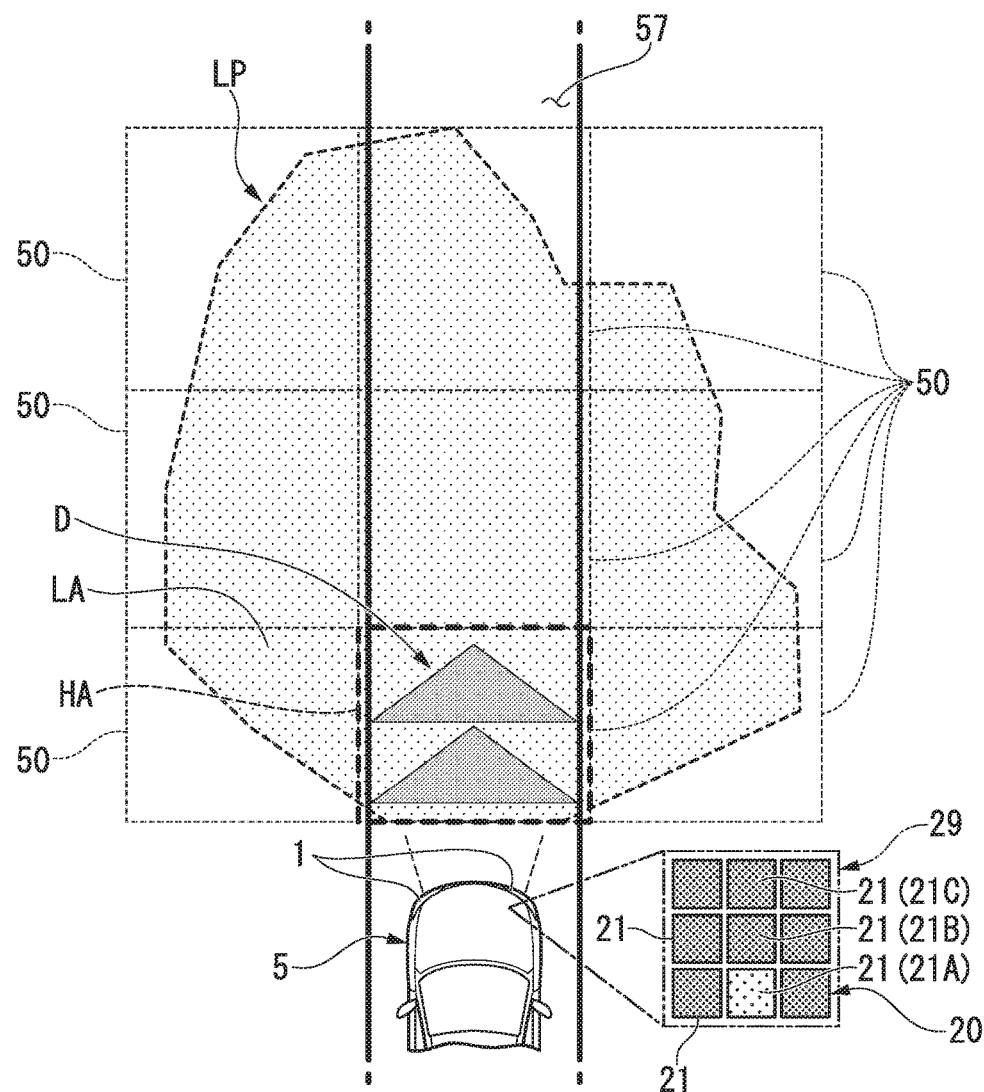
FIG. 3A is a view showing an example of a light distribution pattern radiated from the lighting tool for a vehicle according to the embodiment.

In the state shown in FIG. 3A, the luminescence amount controllers 52 emit light from only the first light emitting element 21A at a center of the lowermost row among the nine light emitting elements 21 of the light source device 29 at a high illuminance, and emit light from the other eight light emitting elements 21 at a low illuminance. As an example, the luminescence amount controllers 52 may set a luminescence amount of the first light emitting element 21A to 100% and set a luminescence amount of the other eight light emitting elements 21 to 80%. Accordingly, the light source device 29 radiates light including the high illuminance region HA corresponding to the first light emitting element 21A and a low illuminance region LA corresponding to the other eight light emitting elements 21. The one light distribution region 50 corresponding to the first light emitting element 21A in the light distribution pattern LP becomes the high illuminance region HA, and the other eight regions become the low illuminance region LA. Further, the low illuminance region LA sufficiently satisfies the illuminance required as a low beam.

The light modulation device 31 forms the drawing pattern D on the high illuminance region HA radiated from the first light emitting element 21A. The drawing pattern D is formed as the high gradation part surrounded by the low gradation parts. That is, the light modulation device 31 draws the drawing pattern D as the high gradation part in the high illuminance region HA, and sets a region other than the drawing pattern D as the low gradation part. Accordingly, the drawing pattern D on the road surface 57 is brighter than a portion surrounding the drawing pattern D.

The light modulation device 31 sets the low illuminance region LA radiated from the eight light emitting elements 21A other than the first light emitting element 21A to a high gradation. Accordingly, the light of the low illuminance region LA enters the projection optical system 42 with no loss at the light modulation device 31. In addition, the light modulation device 31 sets the illuminance of the low gradation part of the high illuminance region HA to substantially the same illuminance as that of the low illuminance region LA. In the embodiment, the illuminance of the low illuminance region is 80% with respect to the illuminance of the high illuminance region. Accordingly, the low gradation part of the high illuminance region HA causes a light quantity of 80% in comparison with the high gradation part to enter the projection optical system 42. More specifically, the light modulation device 31 sets a duty ratio between the ON state and the OFF state in the low gradation part of the high illuminance region HA to 8:2. Accordingly, the low gradation part of the high illuminance region HA and the high gradation part of the low illuminance region LA in the light distribution pattern LP have substantially the same illuminance on the road surface 57.

Figure 3B:
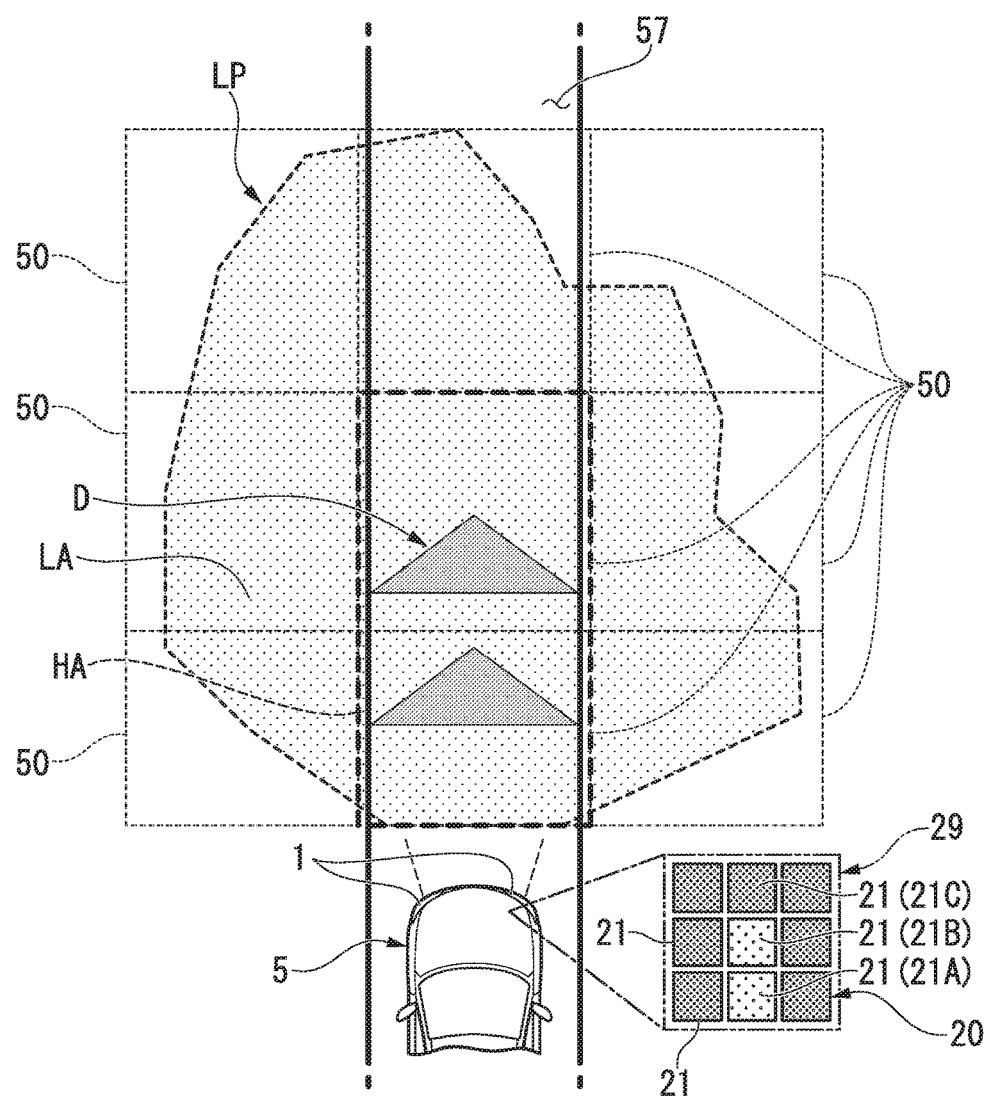
FIG. 3B is a view showing an example of a light distribution pattern radiated from the lighting tool for a vehicle according to the embodiment.

FIG. 3B is a view showing the light distribution pattern LP displayed next to the light distribution pattern LP shown in FIG. 3A. In the state shown in FIG. 3B, the light source device 29 emits light from the first light emitting element 21A disposed in the lowermost portion of the center column with respect to the leftward and rightward direction and the second light emitting element 21B disposed in the center of the center column with respect to the leftward and rightward direction among the nine light emitting elements 21 at a high illuminance and emits light from the other seven light emitting elements 21 at a low illuminance. Accordingly, the light source device 29 radiates light including the high illuminance region HA corresponding to the first light emitting element 21A and the second light emitting element 21B and the low illuminance region LA corresponding to the other seven light emitting elements 21. The two light distribution regions 50 in the light distribution pattern LP corresponding to the first light emitting element 21A and the second light emitting element 21B become the high illuminance region HA, and the other seven regions become the low illuminance region LA.

In the state shown in FIG. 3B, the drawing pattern D is formed across the two light distribution regions 50. The luminescence amounts of the two light emitting elements (the first light emitting element 21A and the second light emitting element 21B) are increased to enlarge the high illuminance region HA, and the drawing pattern D is formed on the enlarged high illuminance region HA.

Also in the state shown in FIG. 3B, like FIG. 3A, the light modulation device 31 draws the drawing pattern D as the high gradation part in the high illuminance region HA, and sets a region other than the drawing pattern D to the low gradation part. In addition, the light modulation device 31 sets the low illuminance region LA to a high gradation, and the light modulation device 31 sets the illuminance of the low gradation part of the high illuminance region HA to substantially the same illuminance as that of the low illuminance region LA. Accordingly, the low gradation part of the high illuminance region HA and the high gradation part of the low illuminance region LA in the light distribution pattern LP have substantially the same illuminance on the road surface 57.

Figure 3C:
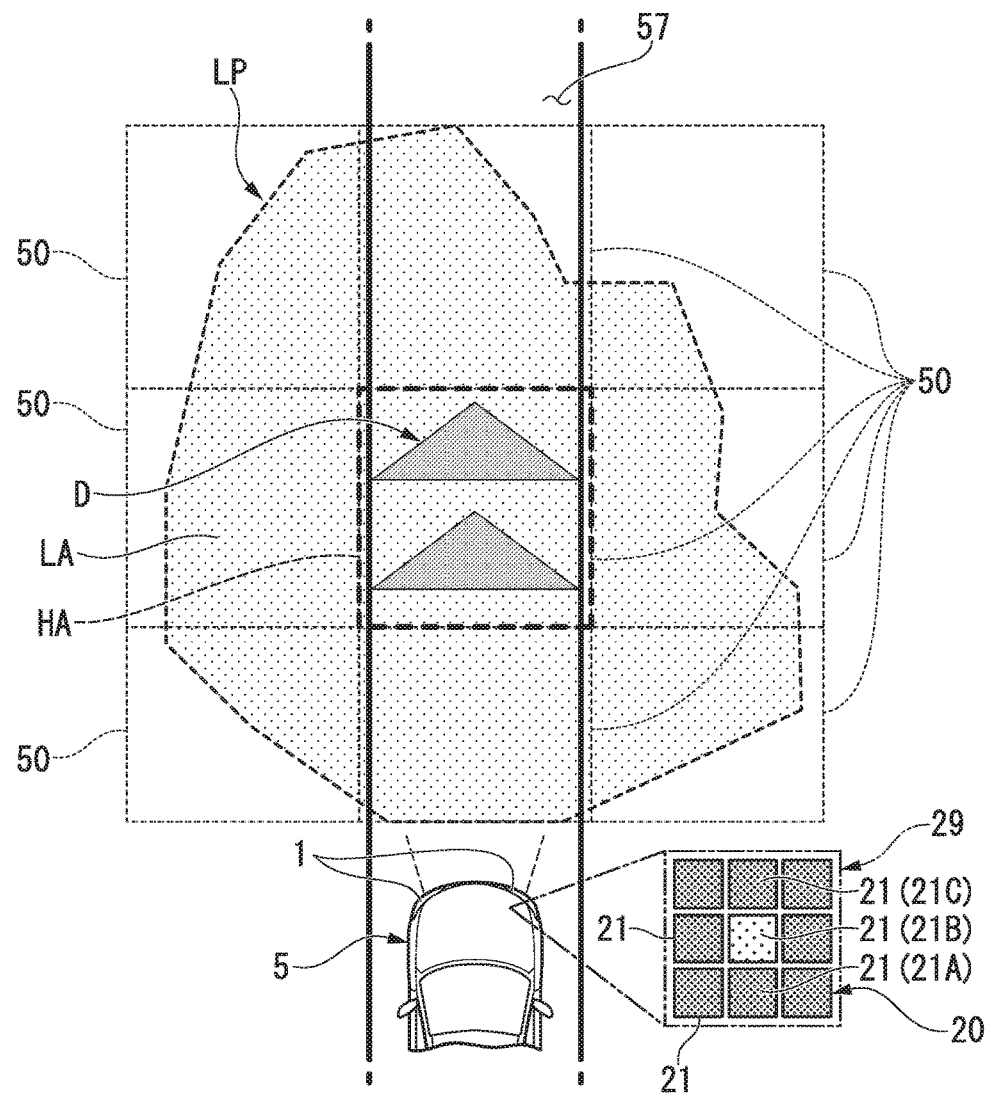
FIG. 3C is a view showing an example of a light distribution pattern radiated from the lighting tool for a vehicle according to the embodiment.

FIG. 3C is a view showing the light distribution pattern LP displayed next to the light distribution pattern LP shown in FIG. 3B. In the state shown in FIG. 3C, the light source device 29 emits light from only the second light emitting element 21B disposed at the center in the leftward and rightward direction and in the upward and downward direction of the nine light emitting elements 21 at a high illuminance, and emits light from the other eight light emitting elements 21 at a low illuminance. Accordingly, the light source device 29 radiates light including the high illuminance region HA corresponding to the second light emitting element 21B and the low illuminance region LA corresponding to the other eight light emitting elements 21. The one light distribution region 50 corresponding to the second light emitting element 21B in the light distribution pattern LP becomes the high illuminance region HA, and the other eight regions become the low illuminance region LA.

In the state shown in FIG. 3C, the drawing pattern D is disposed at a center of the nine light distribution regions arranged in three rows and three columns and is formed in the light distribution region 50 that has made to the high illuminance region HA. Also in the state shown in FIG. 3C, like FIG. 3A and FIG. 3B, the light modulation device 31 draws the drawing pattern D as the high gradation part in the high illuminance region HA, and a region other than the drawing pattern D is made to the low gradation part. In addition, the light modulation device 31 sets the low illuminance region LA to the high gradation, and the light modulation device 31 sets the illuminance of the low gradation part of the high illuminance region HA to substantially the same illuminance as that of the low illuminance region LA. Accordingly, the low gradation part of the high illuminance region HA and the high gradation part of the low illuminance region LA in the light distribution pattern LP have substantially the same illuminance on the road surface 57.

Figure 3D:
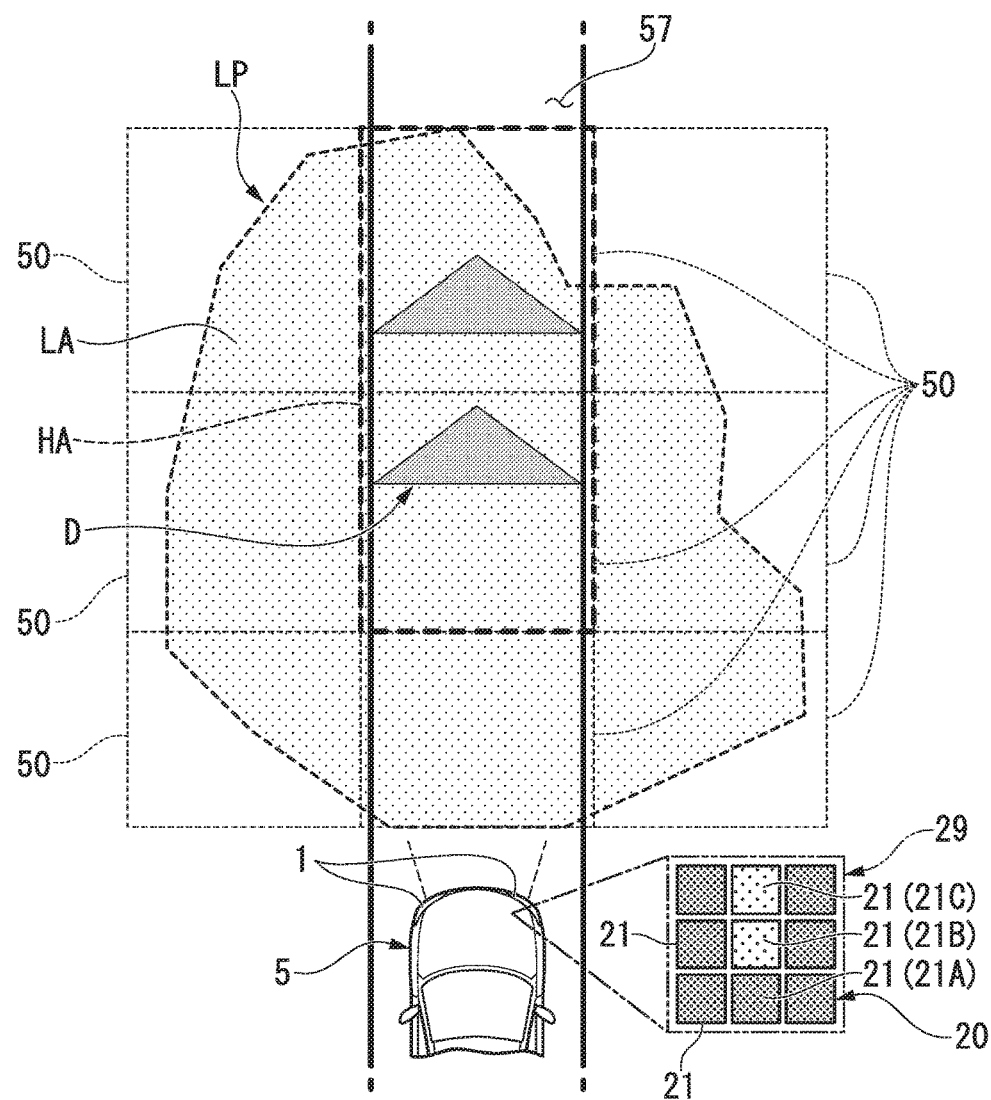
FIG. 3D is a view showing an example of a light distribution pattern radiated from the lighting tool for a vehicle according to the embodiment.
Figure 4A:
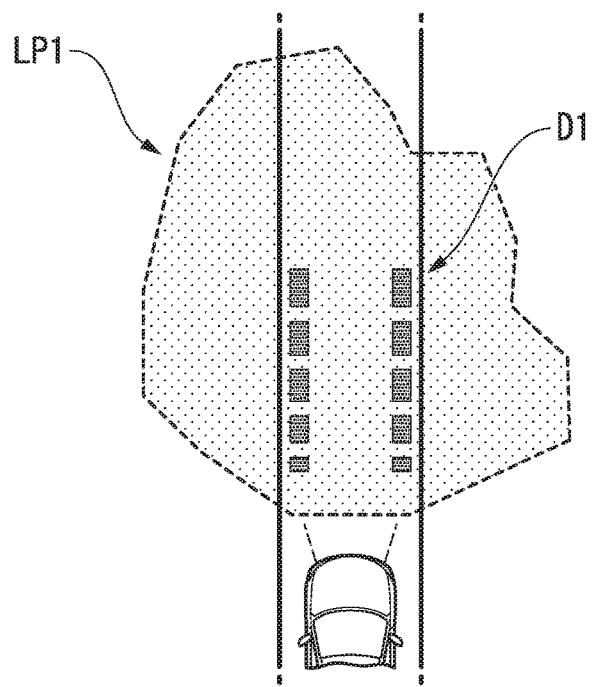
FIG. 4A is a view showing a light distribution pattern of Variant 1.
Figure 4B:
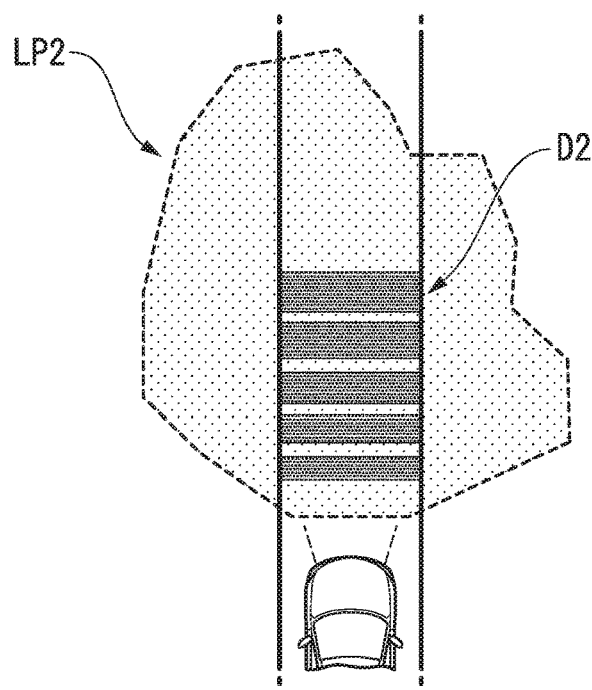
FIG. 4B is a view showing a light distribution pattern of Variant 2.
Figure 4C:
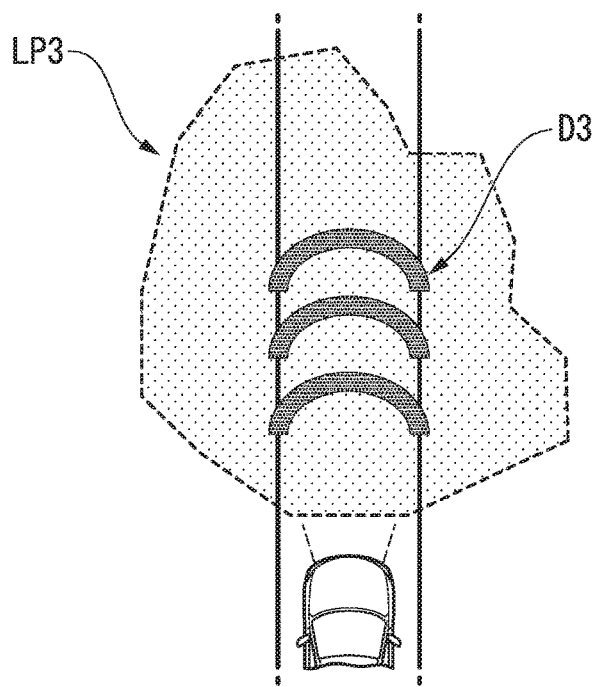
FIG. 4C is a view showing a light distribution pattern of Variant 3.
Figure 4D:
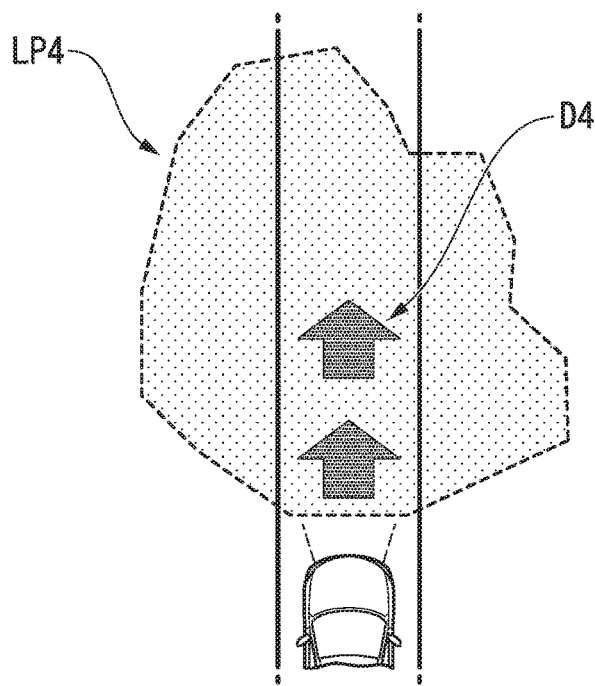
FIG. 4D is a view showing a light distribution pattern of Variant 4.

FIG. 3D is a view showing the light distribution pattern LP displayed next to the light distribution pattern LP shown in FIG. 3C. In the state shown in FIG. 3D, the light source device 29 emits light from the second light emitting element 21B disposed in the center of the center column with respect to the leftward and rightward direction and the third light emitting element 21C disposed in the uppermost portion of the center column with respect to the leftward and rightward direction among the nine light emitting elements 21 at a high illuminance, and emits light from the other seven light emitting elements 21 at a low illuminance. Accordingly, the light source device 29 radiates light including the high illuminance region HA corresponding to the second light emitting element 21B and the third light emitting element 21C and the low illuminance region LA corresponding to the other seven light emitting elements 21. The two light distribution regions 50 corresponding to the second light emitting element 21B and the third light emitting element 21C in the light distribution pattern LP become the high illuminance region HA, and the other seven regions become the low illuminance region LA.

In the state shown in FIG. 3D, the drawing pattern D is formed across two light distribution regions 50. The luminescence amounts of the two light emitting elements (the second light emitting element 21B and the third light emitting element 21C) are increased to enlarge the high illuminance region HA, and the drawing pattern D is formed on the enlarged high illuminance region HA.

Even in the state shown in FIG. 3D, like FIG. 3A, FIG. 3B and FIG. 3C, the light modulation device 31 draws the drawing pattern D as the high gradation part in the high illuminance region HA, and sets a region other than the drawing pattern D to the low gradation part. In addition, the light modulation device 31 sets the low illuminance region LA to the high gradation, and the light modulation device 31 sets the illuminance of the low gradation part of the high illuminance region HA to substantially the same illuminance as that of the low illuminance region LA. Accordingly, the low gradation part of the high illuminance region HA and the high gradation part of the low illuminance region LA in the light distribution pattern LP have substantially the same illuminance on the road surface 57.

According to the embodiment, the light modulation device 31 forms the drawing pattern D as the high gradation part surrounded by the low gradation part in the light distribution pattern LP. Accordingly, the drawing pattern having high illuminance can be formed in the light distribution pattern LP. Accordingly, it is possible to provide the lighting tool for a vehicle in which safe performance is enhanced while drawing information on the road surface 57 without darkening the drawing pattern D in the light distribution pattern LP in comparison with other regions.

In addition, according to the embodiment, the drawing pattern D that is brighter than other portions in the light distribution pattern LP can be formed by one light source device 29 and one projection optical system 42.

While the above-mentioned light distribution pattern can be realized by installing the lighting tool of the related art that forms a light distribution on the front side and the lighting tool that radiates only the drawing pattern, an increase in size of the lighting tool may occur due to requirements of a plurality of light source devices and a plurality of projection optical systems. On the other hand, according to the embodiment, since a plurality of light source devices and a plurality of projection optical systems are not required, a compact lighting tool for a vehicle can be provided.

According to the embodiment, the light modulation device 31 changes an outline of the light distribution pattern LP using the zero gradation part. Accordingly, it is possible to provide a function of an adaptive front-lighting system (AFS) to the lighting tool 1 for a vehicle by changing the outline of the light distribution pattern LP.

According to the embodiment, the light modulation device 31 sets the low illuminance region LA to the high gradation part while forming the drawing pattern D of the high gradation part surrounded by the low gradation part on the high illuminance region HA. Further, the low gradation part of the high illuminance region HA and the high gradation part of the low illuminance region LA in the light distribution pattern LP have substantially the same illuminance on the road surface 57. For this reason, since most of the portions other than the drawing pattern D are set to the low illuminance region LA by the light source device 29, a portion that partially shields the light by the light modulation device 31 becomes only a portion other than the drawing pattern D in the high illuminance region HA. For this reason, it is possible to realize the light distribution pattern LP in which the drawing pattern D is brighter than the portions other than the drawing pattern D while increasing efficiency of utilization of light.

In the embodiment, the light modulation device 31 moves the drawing pattern D from the vicinity of the vehicle toward the side away from the vehicle by varying the drawing pattern D in the sequence of FIG. 3A, FIG. 3B, FIG. 3C and FIG. 3D. In addition, according to movement of the drawing pattern D, the luminescence amount controllers 52 cause the drawing pattern to be included in the high illuminance region HA by controlling the luminescence amounts of the plurality of light emitting elements 21 and moving and enlarging the high illuminance region HA. For this reason, even when the drawing pattern D is moved, it is possible to realize the light distribution pattern LP that brightens the drawing pattern D in comparison with portions other than the drawing pattern D while increasing efficiency of utilization of light.

In the embodiment, the control unit 13 may instruct the light modulation device 31 to control a shape of the drawing pattern D on the basis of the detection results of the vehicle speed detector 16. Accordingly, the speed of the vehicle 5 is imaged and displayed on the road surface 57, and a driver can drive the vehicle 5 while the driver recognizes the speed of his/her own vehicle. For example, a speed of switching the drawing pattern D in the sequence of FIG. 3A, FIG. 3B, FIG. 3C and FIG. 3D can be varied according to the detection results of the vehicle speed detector 16. That is, the control unit 13 moves a position of the drawing pattern D in the light distribution pattern LP in the traveling direction of the vehicle 5, and changes a moving speed of the drawing pattern D according to the speed of the vehicle.

More specifically, for example, when the speed of the vehicle 5 is a speed close to a legal speed within the legal speed, the drawing pattern D may be moved at a high speed from the vicinity of the vehicle 5 toward the side away from the vehicle 5. Accordingly, the speed of the vehicle 5 can be recognized by the driver as a higher speed than that in actuality, and the driver can feel an exhilarating feeling of driving.

Further, in the embodiment, the control unit 13 may display the drawing pattern D that prompts change of speed of the vehicle 5 on the basis of the detection results of the vehicle speed detector 16 and the information of the expected traveling road from the expected traveling road information acquisition part 17. For example, when the vehicle 5 comes off a highway onto a general road, the expected traveling road information acquisition part 17 obtains information that the vehicle 5 has entered a connecting road connecting the highway and the general road from a navigation system. The control unit 13 instructs the light modulation device 31 to display the drawing pattern D that prompts a driver to perform deceleration on the road surface 57 when it is determined that an actual speed of the vehicle 5 exceeds a speed limit of the connecting road by comparing the speed limit with the actual speed of the vehicle 5 acquired by the vehicle speed detector 16. For example, the driver can be prompted to perform deceleration by reducing the moving speed of the drawing pattern D that moves from the vicinity of the vehicle 5 toward the side away from the vehicle 5. Alternatively, the driver may be prompted to perform deceleration by increasing the moving speed of the drawing pattern D that moves from the side away from the vehicle 5 toward the vicinity of the vehicle 5. In this case, the driver can be prompted to ease off an accelerator or perform braking.

The expected traveling road information acquisition part 17 may acquire information of the expected traveling road from the image information imaged by the imaging device 15. That is, the information acquired by the expected traveling road information acquisition part 17 may be image information of in front of the vehicle 5. In this case, for example, when an inter-vehicle distance to a preceding vehicle is too small, the control unit 13 instructs the light modulation device 31 to display the drawing pattern D that prompts a driver to perform deceleration.

Further, the case in which the control unit 13 displays the drawing pattern D that prompts deceleration on the basis of the information acquired by the expected traveling road information acquisition part 17 has been described. However, the control unit 13 can also form the drawing pattern D that prompts acceleration of the vehicle 5. That is, the control unit 13 instructs the light modulation device 31 to display the drawing pattern D that prompts change of the speed of the vehicle 5.

(Variants 1 to 4)

FIG. 4A to FIG. 4D are views showing the light distribution patterns LP1, LP2, LP3 and LP4 of Variants 1 to 4. The light distribution patterns LP1 to LP4 of Variants 1 to 4 include the drawing patterns D1, D2, D3 and D4 having different shapes. Also when the drawing patterns D1 to D4 of Variants 1 to 4 are employed instead of the drawing pattern D of the pair of isosceles triangles of the above-mentioned embodiment, the same effects can be exhibited. Further, the shape of the drawing pattern is not limited to these shapes and may be any shape.

(Variant 5)

Figure 5:
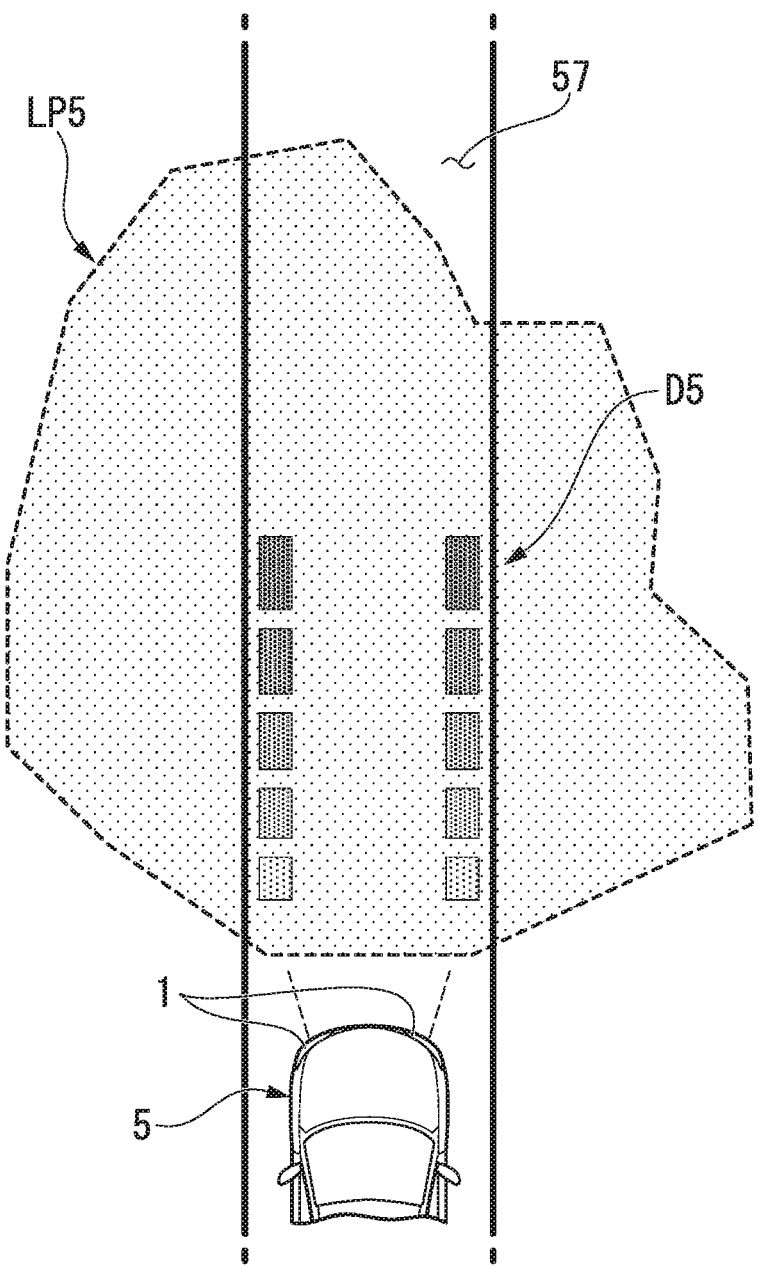
FIG. 5 is a view showing a light distribution pattern of Variant 5.

FIG. 5 is a view showing the light distribution pattern LP5 of Variant 5. The light distribution pattern LP5 of Variant 5 includes the drawing pattern D5. The drawing pattern D5 has an illuminance that gradually increases from the vicinity of the vehicle 5 toward the side away from the vehicle 5.

In the variant, the light modulation device 31 generates a plurality of gradations in the high gradation part. That is, the light modulation device 31 adjusts a duty ratio between the ON state and the OFF state in a multi-step manner, and forms a distribution of the illuminance in the light that enters the projection optical system 42 for the high gradation part. Further, the multi-step gradations in the high gradation part have higher level than the gradations of the low gradation part.

According to this variant, the light modulation device 31 generates a plurality of gradations in the high gradation part, and forms a distribution of the illuminance of the drawing pattern D5 in the light distribution pattern LP5. Accordingly, more varied expressions are possible for the drawing pattern D5. For example, various expressions such as an expression in which a portion to be emphasized in the drawing pattern D5 has the highest gradation, or the like, become possible.

In addition, in general, the light radiated to the road surface 57 far from the vehicle 5 is dark and is hard to be seen by a driver. Accordingly, by increasing the illuminance gradually from the vicinity of the vehicle 5 toward the side away from the vehicle 5, it is possible to make the drawing pattern D5 displayed on the road surface 57 on the side away from the vehicle 5 clearly seen by a driver.

(Variant 6)

Figure 6:
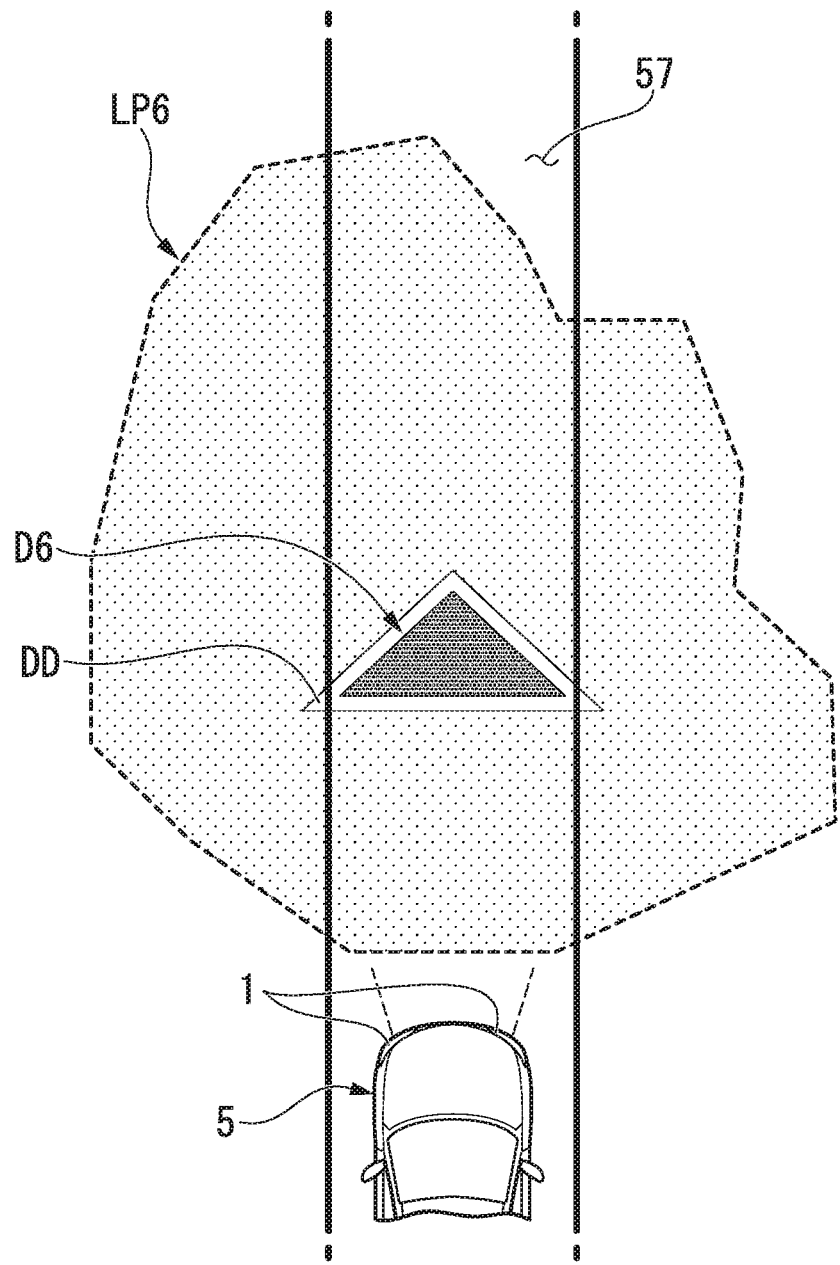
FIG. 6 is a view showing a light distribution pattern of Variant 6.

FIG. 6 is a view showing the light distribution pattern LP6 of Variant 6. The light distribution pattern LP6 of Variant 6 includes the drawing pattern D6. A dark section DD is formed around the drawing pattern D6 in the light distribution pattern LP6.

In this variant, the light modulation device 31 trims a periphery of the drawing pattern D6 formed on the high gradation part using the zero gradation part. That is, the light modulation device 31 forms a high gradation part, a zero gradation part that trims a periphery of the high gradation part, and a low gradation part configured to surround a periphery of the high gradation part.

According to this variant, the drawing pattern D6 derived from the high gradation part and a region derived from the low gradation part around the periphery thereof can be clearly partitioned by the dark section derived from the zero gradation part. Accordingly, the drawing pattern D6 can be easily recognized by a driver. In addition, the dark section derived from the zero gradation becomes a small area formed by trimming of the drawing pattern D6, and cannot easily exert an influence on visibility of the road surface. That is, according to this variant, the drawing pattern D6 can be more clearly recognized while securing safe performance.

While preferred embodiments of the invention and variants thereof have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

What is claimed is:

1. A lighting tool for a vehicle that radiates light from the vehicle toward a road surface, the lighting tool for the vehicle comprising:
   a light source device;
   a light modulation device that modulates light emitted from the light source device to form multi-gradation light including a high gradation part, a low gradation part and a zero gradation part;
   a projection unit that projects the multi-gradation light emitted from the light modulation device to the road surface as a light distribution pattern; and
   a control unit that controls the light source device and the light modulation device,
   wherein
   the light modulation device forms a drawing pattern as the high gradation part which is surrounded by the low gradation part in the light distribution pattern,
   the light modulation device is a digital mirror device that includes a reflection control surface configured by arranging a plurality of mirror elements that are tiltable,
   the light source device has a light source unit in which a plurality of light emitting elements are arranged,
   the control unit has a luminescence amount controller that individually varies luminescence amounts of the plurality of light emitting elements,
   the plurality of light emitting elements emits light to the light modulation device, the light is reflected at the reflection control surface, and thereby, a synthetic light distribution pattern is formed on the road surface, the synthetic light distribution pattern being generated by synthesizing a plurality of light distribution regions corresponding to each of the plurality of light emitting elements,
   the light emitting element that radiates a light distribution region which includes the drawing pattern among the plurality of light distribution regions is made to emit at a high illuminance compared to an illuminance of the light emitting element that radiates a light distribution region which does not include the drawing pattern among the plurality of light distribution regions, and
   the plurality of mirror elements of the digital mirror device, which reflects light toward the light distribution region including the drawing pattern, includes a mirror element that is controlled so as to form the drawing pattern as the high gradation part.

2. The lighting tool for the vehicle according to claim 1, wherein the light modulation device forms an outline of the light distribution pattern using the zero gradation part.

3. The lighting tool for the vehicle according to claim 1, wherein the mirror element is controlled to reflect light toward regions other than the drawing pattern of the digital mirror device, which reflects light toward the light distribution region including the drawing pattern, so that illuminance of the road surface corresponding to a region other than the drawing pattern in the light distribution region including the drawing pattern is substantially the same with illuminance of the road surface corresponding to the light distribution region which does not include the drawing pattern among the plurality of light distribution regions, as the low gradation part.

4. The lighting tool for the vehicle according to claim 1, wherein
the light modulation device moves the drawing pattern, and
the luminescence amount controller controls the luminescence amounts of the plurality of light emitting elements and changes illuminance of the light emitting element that radiates the light distribution region including the drawing pattern from low illuminance emission to high illuminance emission after the movement.

5. The lighting tool for the vehicle according to claim 1, further comprising a vehicle speed detector that detects a speed of the vehicle is provided,
wherein the control unit controls a shape of the drawing pattern by instructing the light modulation device on a basis of a detection result of the vehicle speed detector.

6. The lighting tool for the vehicle according to claim 5, wherein the control unit moves a position of the drawing pattern in the light distribution pattern along a traveling direction of the vehicle, and varies a moving speed of the drawing pattern according to the speed of the vehicle.

7. The lighting tool for the vehicle according to claim 5, further comprising an expected traveling road information acquisition part that acquires information of an expected traveling road of the vehicle from an outside, and
wherein the control unit displays the drawing pattern that prompts change of the speed of the vehicle by instructing the light modulation device on the basis of the detection result of the vehicle speed detector and the information acquired by the expected traveling road information acquisition part.

8. The lighting tool for the vehicle according to claim 1, wherein the light modulation device generates a plurality of gradations in the high gradation part, and forms a distribution in an illuminance of the drawing pattern in the light distribution pattern.

9. The lighting tool for the vehicle according to claim 1, wherein the light modulation device trims a periphery of the drawing pattern formed with the high gradation part by using the zero gradation part.

10. The lighting tool for the vehicle according to claim 1, further comprising a diffusion plate between the light source device and the light modulation device.

* * * * *